United States Patent

[11] 3,544,021

[72] Inventors Newton R. Wilson;
Bill T. Morgan, Bartlesville, Oklahoma
[21] Appl. No. 781,340
[22] Filed Dec. 5, 1968
[45] Patented Dec. 1, 1970
[73] Assignee Phillips Petroleum Company
a corporation of Delaware

[54] DOUBLE-WALL BLOW MOLDED CARTON
3 Claims, 6 Drawing Figs.
[52] U.S. Cl. .................................................... 220/7;
229/30; 220/9
[51] Int. Cl. ..................................................... B65d 7/22,
B65d 11/16, B65d 11/18
[50] Field of Search ........................................ 220/6, 7,
9(P.B.C.), 31—9(R), (97-B); 217/69, 65, 15;
229/30, 49

[56] References Cited
UNITED STATES PATENTS
529,057 11/1894 Alexander ..................... 217/69
2,775,360 12/1956 Phillips ........................... 220/97X
2,961,139 11/1960 Nobili ............................. 229/49X
3,246,828 4/1966 Branscum et al. ............. 229/30
3,282,635 11/1966 Himelreich ..................... 220/9X FOREIGN PATENTS
721,103 12/1954 Great Britain ................ 229/49

Primary Examiner—Raphael H. Schwartz
Attorney—Young and Quigg

ABSTRACT: A collapsible carton of double-wall construction and an apparatus for forming the carton. The carton, having a bottom and four side walls, is maintained in the assembled condition by clips which also serve as guides for similarly constructed cartons placed thereover. The apparatus includes a pair of mold halves which define an internal cavity partitioned into a bottom and four side wall sections. Air holes maintain communication between the sections so that the plastic material may be blow molded by a single needle protruding into one of the cavity sections.

Patented Dec. 1, 1970

INVENTORS
N. R. WILSON
B. T. MORGAN

BY

*Young and Gregg*

ATTORNEYS

DOUBLE-WALL BLOW MOLDED CARTON

This invention relates to blow molding of thermoplastic material. In one aspect, the invention relates to an improved apparatus for blow molding thermoplastic cartons. In another aspect, it relates to a carton formed by said apparatus.

Plastic cartons are increasingly finding utility in the field of distributing and dispensing goods in commerce. Such cartons should possess qualities of strength, ruggedness, stackability, and storability. The carton constructed according to this invention is ideally suited for commerce, meeting all the design parameters set forth above. It is of double-wall construction providing the carton with column strength and ruggedness. It is collapsible to a flat blank, facilitating storage and transportability. The carton is maintained in assembled condition by clips which in addition to their fastening function provide guides for vertically adjacent cartons thereby improving the stackability of the cartons.

The apparatus for forming the cartons from a tubular parison includes a split mold which in its closed position defines a cavity in the form of a carton blank. Partitions are provided so that the cavity is divided into five sections (a bottom section and four sidewall sections). The partitions defining the boundaries between each sidewall section and the bottom section include lands for pinch forming integral hinges between the carton bottom and its four sidewalls. Air passages interconnect the cavity sections so that air injected by a single blow needle communicates with all sections and operates to expand the parison therein to form double-wall envelopes in each section.

While many thermoplastic materials may be employed in the practice of this invention, one of the polyolefins, e.g. polyethylene or polypropylene, is preferred since they possess ideal properties for the blow molding process.

An object of this invention is to provide a carton which possesses qualities of strength, ruggedness, stackability, and storability;

Another object is to provide a collapsible carton of double-wall construction; and A further object is to provide a novel blow molding apparatus for forming a double-wall collapsible carton.

These and other objects will become apparent to those skilled in the art from the following disclosure taken in conjunction with the attached drawings in which.

Figure 1:
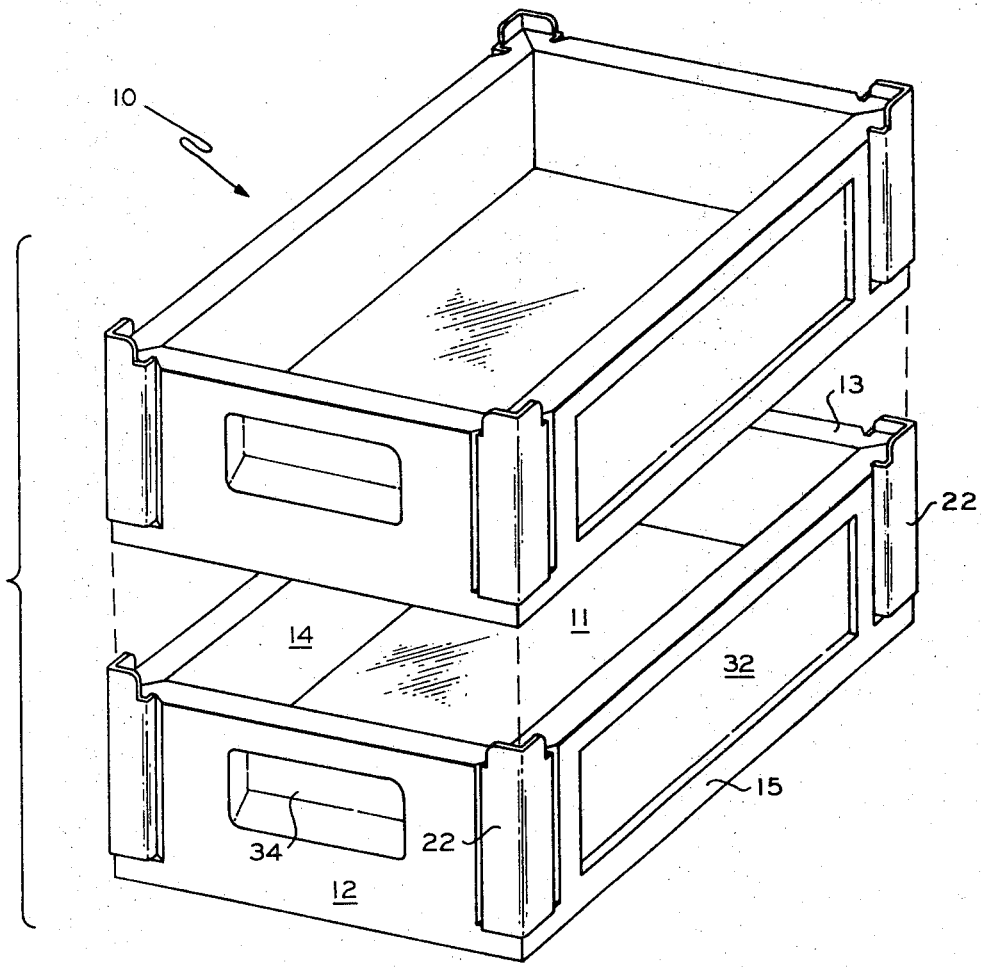
FIG. 1 is a perspective view of a pair of cartons illustrating the stackability feature provided by this invention.
Figure 2:
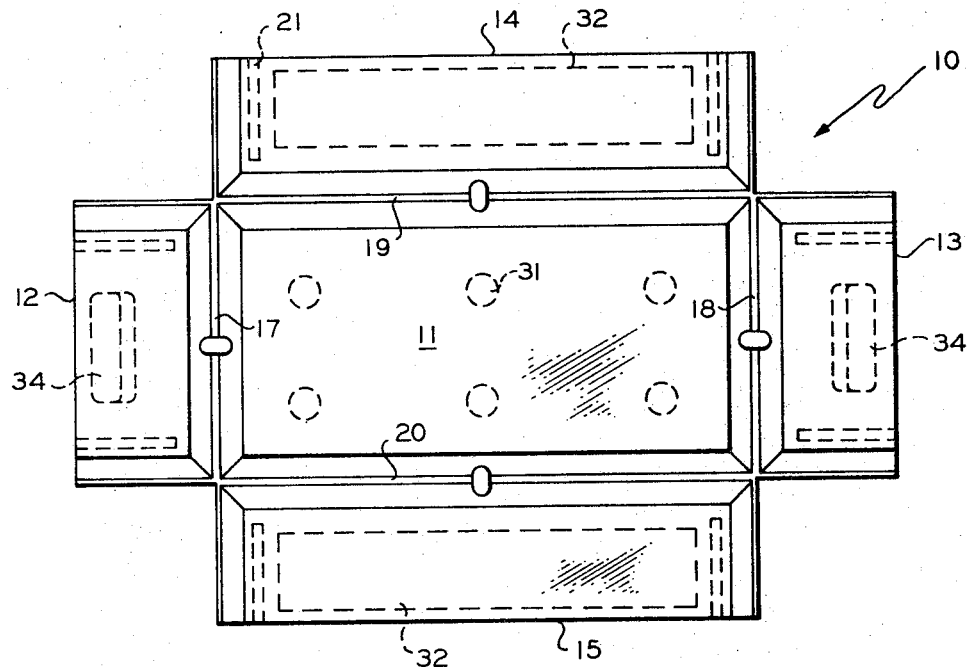
FIG. 2 is a plan view of a blank for forming the cartons shown in FIG. 1 and also illustrating the collapsed position of the carton.
Figure 3:
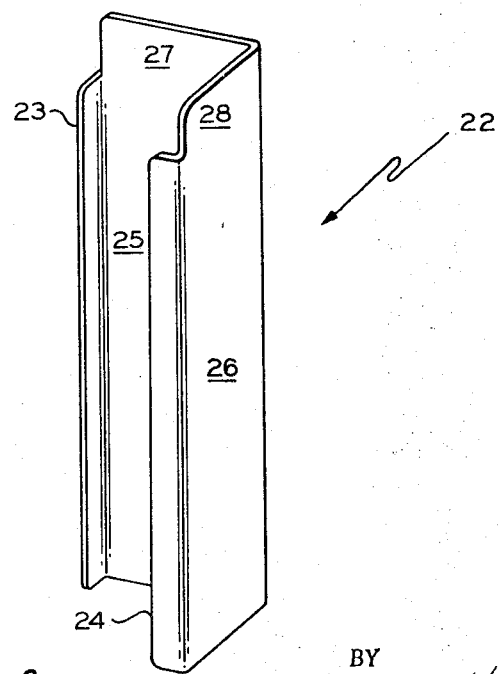
FIG. 3 is a perspective view of a clip employed to maintain the cartons in assembled condition.

With reference to FIGS. 1, 2, and 3, a carton 10 constructed according to this invention is seen to include a base, or bottom 11, and four sidewalls 12, 13, 14 and 15. The carton 10 is collapsible to a flat position as shown in FIG. 2 which also represents the blank as ejected from the blow molding apparatus described in detail below. As illustrated, the blank 10 is a relatively flat article with the side walls 12, 13, 14 and 15 lying in the same plane as the bottom 11. The bottom 11 and sidewalls 12—15 are of double-wall construction which lends properties of strength and ruggedness to the assembled carton. Each of the sidewalls 12—15 are pivotally connected to the bottom 11 by means of integral pinch-formed hinges 17, 18, 19, and 20, respectively. The sidewalls 12—15 are movable about their respective hinges to an upright position wherein each is disposed perpendicularly to the bottom 11. In the upright position, the edges of each sidewall 12—15 mate with the edges of adjacent sidewalls 12—15 forming corners. The walls 12—15 and the bottom 11 are provided with tapered edges so that the assembled carton defines an interior volume in the form of a rectangular prism. Each corner defined by the mating edges is flanked by a pair of longitudinally extending grooves 21 formed in the side walls 12—15. The walls 12—15 are maintained in the upright position by means of four fasteners 22, each having flanged portions 23 and 24 which are received in pairs of the grooves 21, 21. While the fastener 22 may be of any suitable structure and material, a metal clip of the type shown in FIG. 3 is ideal because its resiliency facilitates assemblage and its strength securely maintains the carton 10 in the assembled condition. As shown in FIG. 3, each clip 22 has a pair of rectangularly disposed sides 25 and 26, each of which has inwardly turned portion which constitutes the flanges 23 and 24. The flanges 23 and 24 terminate a short distance from the top of the clip 22, leaving flat portions 27 and 28. Returning to FIG. 1, the clips 22 fit around each corner with the flanges 23 and 24 being received in pairs of grooves 21, 21. The length of each of the flanges 23 and 24 is coextensive with the length of the groove 21 so that the flat portions 27 and 28 protrude a short distance above the top of the carton 10. The grooves 21 terminate a short distance above the bottom of each of the sidewalls 12—15 leaving exposed a portion of the corner defined by the mating sidewall edges.

As shown in FIG. 2, the bottom 11 is provided with cylindrically shaped recesses 31 and the sidewalls 14 and 15 are each provided with rectangularly shaped recesses 32. The recesses 31 and 32 add strength and rigidity to the structure. Each of the sidewalls 12 and 13 which in this embodiment constitute the carton end walls, have formed therein a recess 34 which provides a means for gripping the carton 10.

Now with the carton 10 assembled, it will be apparent that the clips 22 having portions 27 and 28 extending above the top of the carton 10 provide guide means for a carton of similar construction placed vertically thereover. The exposed portion of the corners are received in the four pairs of rectangularly disposed upper portions 27 and 28 which serve to constrain attempted relative lateral and longitudinal movement of the two cartons 10. Thus, it will be appreciated that a plurality of cartons 10 can be arranged in stacked relation and that the stability of such a stack is greatly improved by the clips 22. The clips 22 as previously stated may be formed of metal, and therefore, when arranged in contacting relation and suitably grounded, provide a conductor for draining off static electricity and thus reducing the amount of dust pickup by the cartons 10 during shipping or storage. It should again be emphasized that the fasteners or clips 22 may take a variety of forms and may be composed of different materials depending on the use contemplated for the carton 10. For example, if the cartons 10 are used for storage wherein many of the cartons are vertically stacked, relatively high structural strength is required. The metal clips 22 add strength to the cartons enhancing their stackability. However, if the cartons 10 are used to transport or collect material such as vegetables, the stackability feature is not required. Hence the structural strength requirement of the carton 10 is low, permitting the use of a molded plastic clip or merely a strap.

Figure 4:
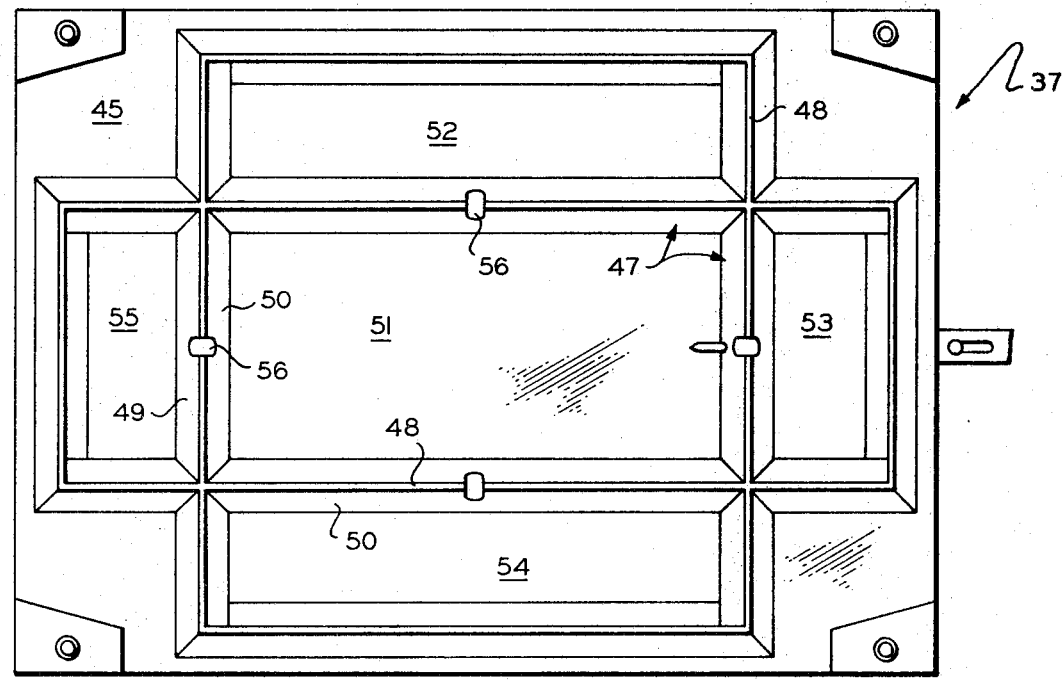
FIGS. 4 and 5 are plan views of the mold halves used to form the carton blank shown in FIG. 2.
Figure 5:
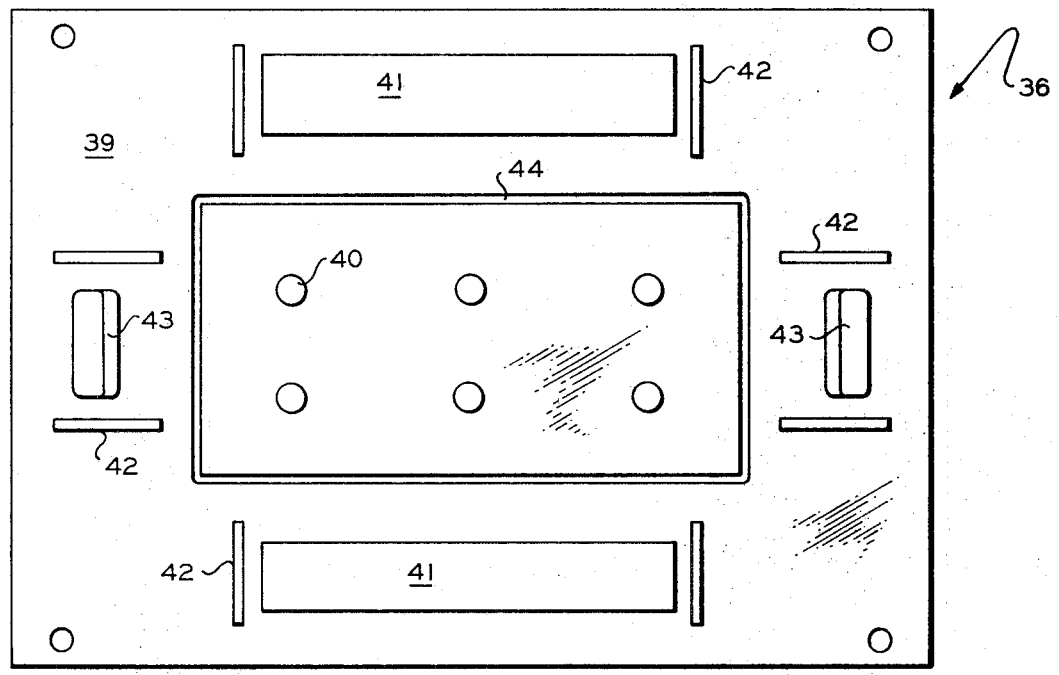

The blow molding apparatus for forming the carton 10 shown in FIG. 1 will be described with reference to FIGS. 4, 5 and 6. The apparatus includes a pair of mold halves 36 and 37 which, when in the closed position, define an internal cavity 38.

The mold half 36 is configured to present a platelike surface 39 and a plurality of particularly shaped projections designated 40, 41, 42, and 43. The projections 40 and 41 provide the means for forming the reinforcing recesses 31 and 32 in the blank 10 shown in FIG. 2. The projections 42 and 43 provide the means for forming the grooves 21 and gripping recesses 34, respectively, in the sidewalls of the carton 10. A continuous groove 44, semicircular in section is milled out of the mold half 36 forming a rectangular loop (see FIG. 5).

The mold half 37 is provided with a flat internal surface 45 and has formed therein a system of V-shaped, interconnected grooves 46 which receive insert bars 47. The insert bars 47 are square in cross section and have a truncated edge presenting a narrow flat surface 48. With the bars 47 disposed on edge in the grooves 46, the narrow, flat surface 48 faces outwardly and is flanked by a pair of tapered walls 49 and 50. The pattern of the V-shaped grooves 46 is such that when the bars 47 are received therein and with the mold halves 36 and 37 in the closed position, the cavity 38 is partitioned into sections 51, 52, 53, 54, and 55 as shown in FIG. 4. The insert bars 47 which define the section 51 are provided with transversely extending openings 56 so that the pressure communication is maintained between all the sections 51—55. With the mold halves 36 and 37 in the closed position, the narrow surfaces 48 of the bars 47 defining section 51 form a rectangle which registers with the rectangularly shaped groove 44 of mold half 36 and therewith provide the means for forming the hinges 17—20 of the blank 10 shown in FIG. 2. The narrow surfaces 48 of the insert bars 47 defining the outer limits of the cavity 38 engages the platelike surface 39 of mold half 36 and serve as pinchoff lands.

Figure 6:
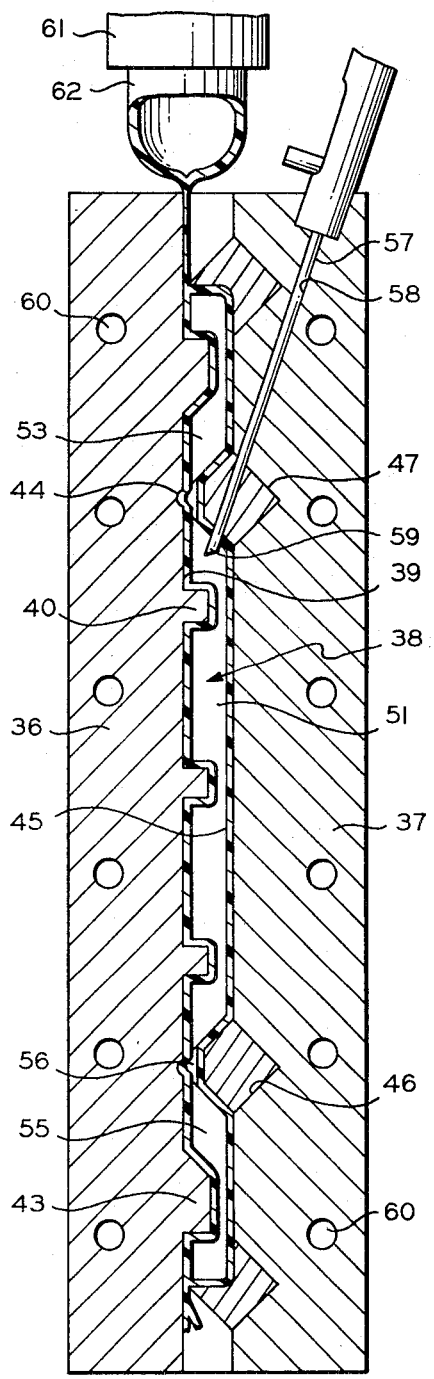
FIG. 6 is a longitudinal sectional view of the mold halves shown in the closed position.

As best seen in FIG. 6, a conventional hollow blow molding needle 57 is received through a suitable bore 58 formed in mold half 37 and presents a tip 59 internally of the section 51 of cavity 38. Suitable cooling channels 60 are provided for maintaining the temperature of the mold halves 36 and 37.

In practice, thermoplastic material such as polyethylene is extruded through a conventional extruder die 61 forming a tubular parison 62. The mold halves 36 and 37 are closed over the parison 62; the rectangle formed of the surfaces 48 registers with the rectangular groove 44 of mold half 36 causing the parison to be welded therealong and thereby forming the integral hinges 17—20 between the sections 51—55. The pinchoff lands 48 on the insert bars 47 engages the surface 39 of mold half 36 separating the plastic material disposed externally of the cavity 38. Air is injected into the cavity section 51 through the needle 57 expanding the parison 62 outwardly in each of the sections 51—54 to conform to the configuration therein. After sufficient time has passed for the thermoplastic material to set, the mold halves 36 and 37 are separated and the blank 10 substantially in the form shown in FIG. 2 is ejected.

In summary, then, the apparatus of this invention operates to form a multisection, double-wall blank which is manipulatable to form a carton possessing qualities of strength, ruggedness, stackability, and storability.

We claim:

1. A collapsible carton comprising: a body formed from a blank of semirigid moldable material, said body including a bottom and at least four side sections, said sections being of double-wall construction, each of said side sections being integrally joined with said bottom section and projecting outwardly therefrom, the junction of said bottom section and each of said side sections being pinch formed for providing a pivot axis for each of said side sections whereby said side sections are movable to an upright position with respect to said bottom section, each of said side sections in said upright position being angularly disposed with respect to adjacent side sections with edges of each adjacent side section being tapered, abutting an adjacent side section, and therewith forming a corner; each side section and bottom section provided with at least one recess, "each side section having a groove extending substantially parallel to and adjacent each of said tapered edges," and a fastener of relatively rigid material mounted in the grooves adjacent each of said corners and operative to maintain said side sections in said upright positions, said fasteners extending above said side sections and providing guide means for a carton of like dimensions superimposed thereover.

2. The invention as recited in claim 1 wherein each of said grooves extends from the top of its respective side section to a position spaced a short distance above the bottom of the sidewall, said fasteners in the form of clips each being adapted to extend around a corner and having flanges insertable into said grooves, said flanges terminating a short distance from the top of the clip with the flanged portion of the clip having a length coextensive with the length of the grooves, said clips extending upwardly above said corners and flanged portion and presenting perpendicularly disposed walls for retaining a carton of similar dimensions thereover.

3. The invention as recited in claim 2 wherein said clips are constructed of metal.